(12) United States Patent
Lin

(10) Patent No.: US 7,344,144 B2
(45) Date of Patent: Mar. 18, 2008

(54) STEERING CONTROL COUPLING STRUCTURE FOR CHILDREN'S WAGON

(75) Inventor: Hung-Chin Lin, Changhua (TW)

(73) Assignee: Life Style Metal Co., Ltd., Changhua (TW)

( * ) Notice: Subject to any disclaimer, the term of this patent is extended or adjusted under 35 U.S.C. 154(b) by 0 days.

(21) Appl. No.: 11/476,086

(22) Filed: Jun. 28, 2006

(65) Prior Publication Data

US 2007/0114740 A1    May 24, 2007

(30) Foreign Application Priority Data

Nov. 18, 2005  (TW) .............................. 94220076 U

(51) Int. Cl.
 *B62B 3/00* (2006.01)
(52) U.S. Cl. .............................. 280/47.34; 280/87.01; 280/87.021; 403/112; 403/113; 403/117
(58) Field of Classification Search ............... 301/127, 301/126; 280/87.01, 87.021, 87.041, 87.042, 280/87.043, 87.05, 47.34, 47.35; 403/119, 403/113, 117
See application file for complete search history.

(56) References Cited

U.S. PATENT DOCUMENTS 3,069,182 A * 12/1962 Hufford ................... 280/87.01
4,596,422 A * 6/1986 Stahel ..................... 297/378.1
4,744,575 A * 5/1988 Tonelli .................... 280/87.01
5,947,493 A * 9/1999 Pasin et al. ............. 280/47.34
6,186,524 B1 * 2/2001 McQueeny et al. .... 280/87.021
6,206,390 B1 * 3/2001 Borg ..................... 280/87.042
6,948,400 B2 * 9/2005 Nakamura et al. ....... 74/490.05

* cited by examiner

*Primary Examiner*—Christopher P. Ellis
*Assistant Examiner*—John D Walters
(74) *Attorney, Agent, or Firm*—Bacon & Thomas, PLLC

(57) ABSTRACT

A steering control coupling structure used in a children's wagon having a wheel assembly and a towing bar is disclosed to include a linking bracket affixed to the wheel axle of the wheel assembly, a first adapter affixed to a carriage and pivoted with the carriage to the linking bracket by a pivot device, the first adapter having a circular coupling hole and two 135° sector guide holes at two sides of the circular coupling hole, and a second adapter, which is affixed to the linking bracket around the pivot device and has a circular coupling block coupled to the circular hole of the first adapter and two 45° sector guide blocks respectively inserted into the 135° sector guide holes for forcing the second adapter to bias against the first adapter when the towing bar is biased to force the wheel assembly to change the steering direction.

9 Claims, 3 Drawing Sheets

STEERING CONTROL COUPLING STRUCTURE FOR CHILDREN'S WAGON

BACKGROUND OF THE INVENTION

1. Field of the Invention

The present invention relates to children's wagon and more particularly, to a steering control coupling structure for children's wagon.

2. Description of the Related Art

In order to assure accurate steering control, the steering control coupling structure of a conventional children's wagon is made having a complicated design so that the children's wagon can be moved and turned smoothly. However, because a complicated design of steering control coupling structure for children's wagon is comprised of a number of parts, the parts may easily be limited out of place and may not be accurately moved to act against one another. Further, the pivot joint of this design of steering control coupling structure that is connected to the children's wagon is also not steady. Therefore, this design of steering control coupling structure has many points to be improved.

SUMMARY OF THE INVENTION

The present invention has been accomplished under the circumstances in view. It is therefore the main object of the present invention to provide a steering control coupling structure for children's wagon, which has a simple and steady structure and which achieves steering control accurately.

To achieve this and other objects of the present invention, the steering control coupling structure is installed in a children's wagon having a wheel assembly and a towing bar, the steering control coupling structure comprising a carriage, the carriage having a casing; a first adapter fixedly fastened to the casing of the carriage, the first adapter having a coupling means and a guide means; a second adapter, the second adapter having a coupling means pivoted to the coupling means of the first adapter, and a guide means for moving along the guide means of the first adapter to guide and limit the second adapter to bias against the first adapter when the second adapter is biased; a linking bracket fixedly fastened to the wheel assembly of the children's wagon to hold the second adapter for enabling the second adapter to be biased with the linking bracket when the towing bar is biased to change the steering direction of the wheel assembly; and a pivot device fastened to the carriage and the linking bracket to pivotally secure the carriage and the first adapter to the second adapter and the linking bracket.

DETAILED DESCRIPTION OF THE INVENTION

Figure 1:
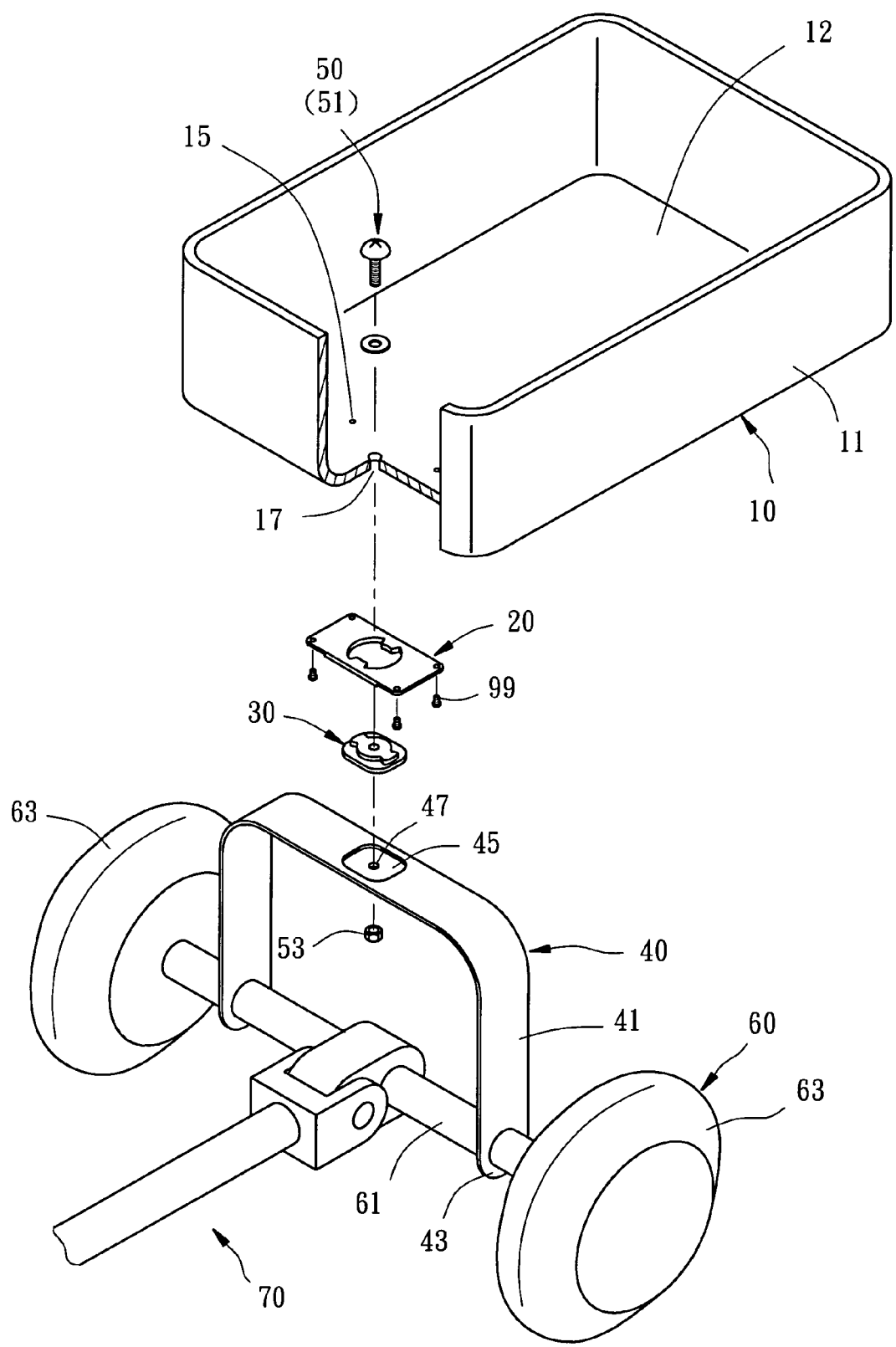
FIG. 1 is an exploded view of a steering control coupling structure in accordance with the present invention.

Referring to FIG. 1, a steering control coupling structure in accordance with the present invention is shown installed in a children's wagon. The children's wagon further comprises a wheel assembly 60, which has a wheel axle 61 and two wheels 63, and a towing bar 70 coupled to the wheel axle 61 of the wheel assembly 60 for towing the wheel assembly 60.

Figure 2:
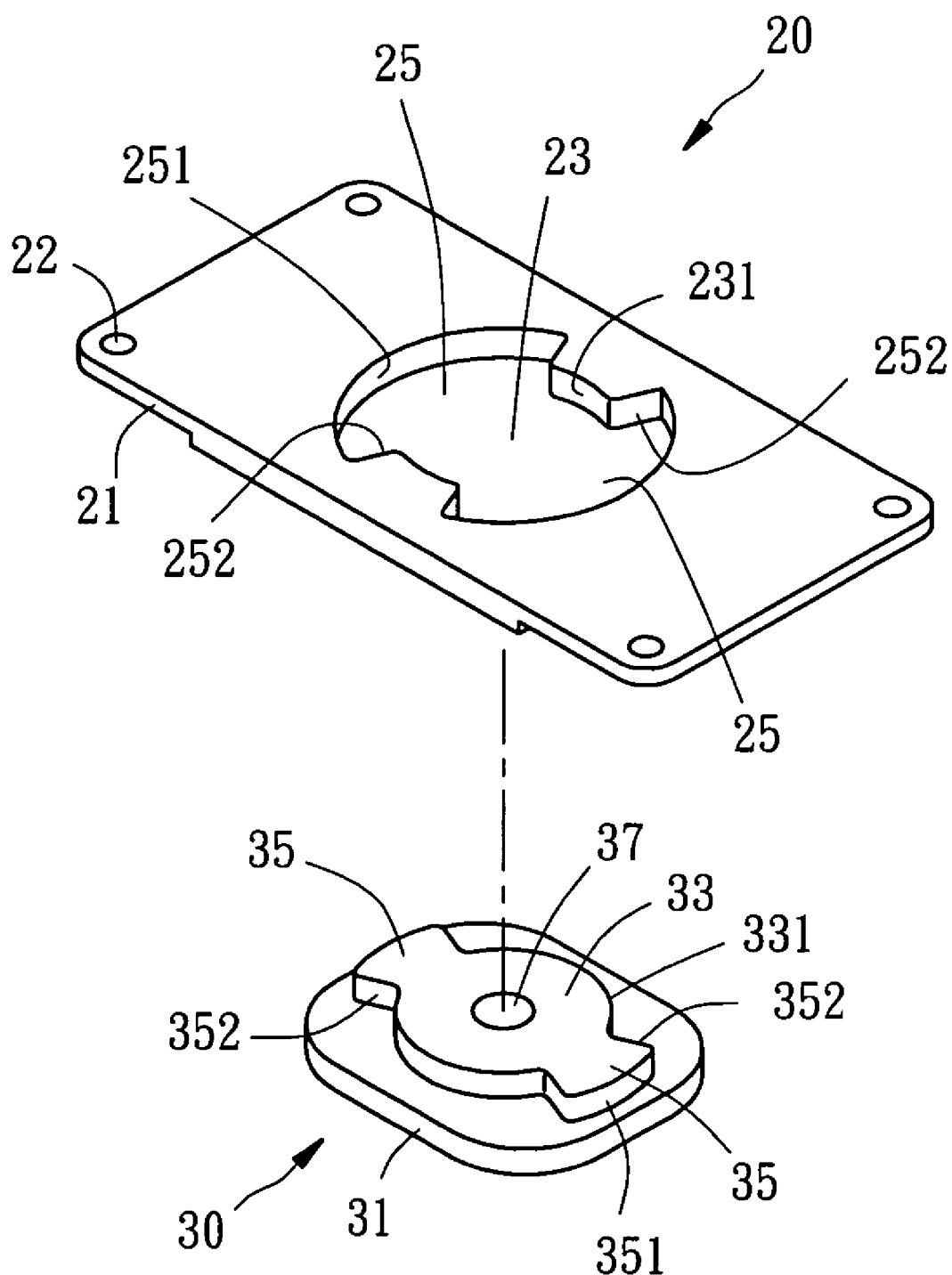
FIG. 2 is an enlarged view of a part of FIG. 1.
Figure 4:
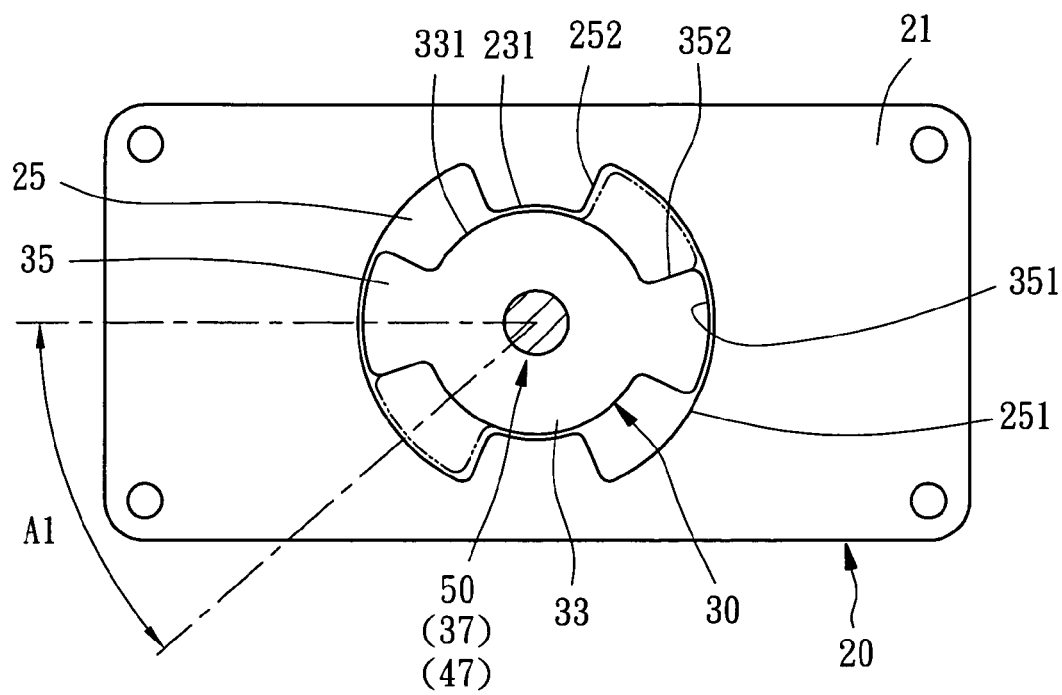
FIG. 4 is a sectional view taken along line 4-4 of FIG. 3.
Figure 3:
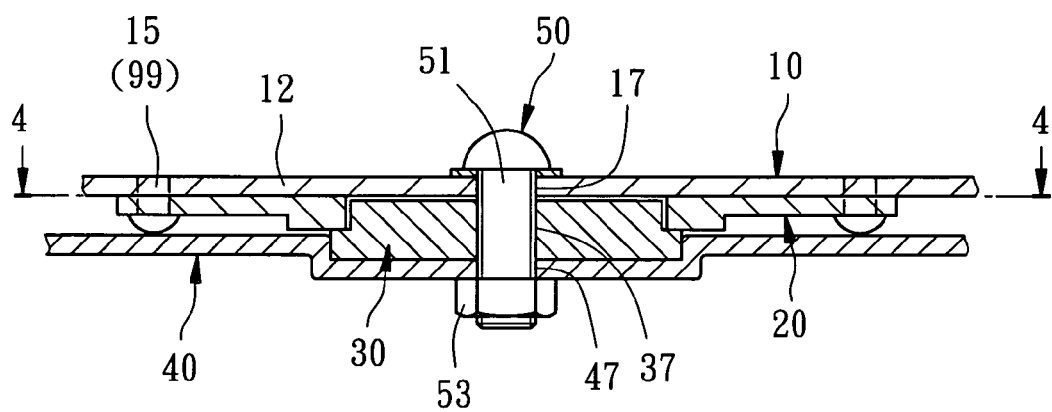
FIG. 3 is a sectional assembly view of a part of the steering control coupling structure according to the present invention.

Referring to FIGS. 2~4 and FIG. 1 again, the steering control coupling structure comprises the following elements:

A carriage 10, which has a casing 11, which has a bottom panel 12, a pivot hole 17 cut through the top and bottom sides of the bottom panel 12 on the middle near one end, and mounting means, for example, four mounting screw holes 15 cut through the top and bottom sides of the bottom panel 12 and equiangularly spaced around the pivot hole 17.

A first adapter 20, which has a flat body 21, four mounting means, for example, mounting through holes 22 cut through the top and bottom sides of the flat body 21 in the four corners of the flat body 21 and respectively fastened to the mounting screw holes 15 of the carriage 10 with a respective screw 99, a coupling means, for example, a circular coupling hole 23 cut through the top and bottom sides of the flat body 21 at the center, two guide means, for example 135° sector guide holes 25 cut through the top and bottom sides of the flat body 21 in the communication with the circular coupling hole 23 at two opposite sides, two smoothly arched bearing edges 231 respectively extending along the circumference of the circular coupling hole 23 at two opposite sides between 135° sector guide holes 25, two smoothly arched sliding edges 251 respectively extending along the circumference of each of the 135° sector guide holes 25, and four stop edges 252 respectively extending along the two distal ends of each of the two 135° sector guide holes 25 and respectively connected between the bearing edges 231 and the sliding edges 251.

A second adapter 30, which has a flat body 31, a coupling means, for example, a circular coupling block 33 protruded from the top side of the flat body 31 and coupled to the circular coupling hole 23 of the first adapter 20, two smoothly arched bearing edges 331 respectively formed on the periphery of the circular coupling block 33 and bore with the bearing edges 231 of the first adapter 20, two guide means, for example, 45° sector guide blocks 35 respectively protruded from the top side of the flat body 31 and formed integral with the periphery of the circular coupling block 33 at two opposite sides in a flush manner and respectively inserted into the 135° sector guide holes 25 of the first adapter 20, two arched sliding edges 351 respectively extending along the circumference of each of the two 45° sector guide blocks 35 and respectively supported and movable along the sliding edges 251 of the first adapter 20, and four stop edges 352 respectively extending along the two distal ends of each of the two 45° sector guide blocks 35 for stopping against the stop edges 252 of the first adapter 20 when the second adapter 30 is biased through a predetermined angle A1 relative to the first adapter 20, a pivot hole 37 cut through the top and bottom sides of the flat body 31 and the circular coupling block 33 at the center.

A linking bracket 40, which has a substantially bracket frame 41 of U-shape, two mounting portions 43 respectively extended from the two distal ends of the bracket frame 41 and fixedly fastened to the wheel axle 61 of the wheel assembly 60 to hold the linking bracket 40 on the wheel axle 61 in a vertical position, a receptacle means, for example, a receiving recess 45 formed on the top side of the invertedly disposed bracket frame 41 on the middle for accommodating the second adapter 30, and a pivot hole 47 vertically cut through the bracket frame 41 at the center of the receiving recess 45 and aimed at the pivot hole 37 of the second adapter 30.

A pivot device 50, which has a pivot bolt 51 vertically downwardly inserted through the pivot hole 17 of the carriage 10, the coupling hole 23 of the first adapter 20, the pivot hole 37 of the second adapter 30 and the pivot hole 47 of the linking bracket 40, and a nut 53 threaded onto the pivot bolt 51 and stopped at the bottom side of the linking bracket 40 to secure the carriage 10 and the two adapters 20 and 30 to the linking bracket 40.

The operation of the present invention is outlined hereinafter with reference to FIGS. 1~4 again. When pulling the towing bar 70, the wheels 63 of the wheel assembly 60 are rotated to move the children's wagon. When biasing the towing bar 70 through an angle A1 to change the steering direction, the linking bracket 40 is biased with the towing bar 70 through a same angle A1, and the second adapter 30 which is press fitted into the receiving recess 45 of the linking bracket 40 is biased with the linking bracket 40.

At this time, the coupling means 33 of the second adapter 30 is biased relative to the coupling means 23 of the first adapter 20, and the guide means 35 of the second adapter 30 are moved along the guide means 25 of the first adapter 20 through a same angle A1 to limit the respective stop edges 352 of the second adapter 30 against the respective stop edges 252 of the first adapter 20, thereby causing the first adapter 20 and the carriage 10 to be turned by the towing bar 70 indirectly.

Although a particular embodiment of the invention has been described in detail for purposes of illustration, various modifications and enhancements may be made without departing from the spirit and scope of the invention. For example, the coupling means and guide means of the first adapter can be formed of blocks, and the coupling means and guide means of the second adapter can be formed of holes to match the blocks of the coupling means and guide means of the first adapter. Accordingly, the invention is not to be limited except as by the appended claims.

What is claimed is:

1. A steering control coupling structure installed in a children's wagon, said children's wagon comprising a wheel assembly and a towing bar, the steering control coupling structure comprising:
   a carriage, said carriage having a casing;
   a first adapter fixedly fastened to the casing of said carriage, said first adapter having a coupling means and a guide means;
   a second adapter, said second adapter having a coupling means coupled to the coupling means of said first adapter, and a guide means for moving along the guide means of said first adapter to guide and limit said second adapter to bias against said first adapter when said second adapter is biased;
   a linking bracket fixedly fastened to said wheel assembly of said children's wagon to hold said second adapter for enabling said second adapter to be biased with said linking bracket when said towing bar is biased to change the steering direction of said wheel assembly; and
   a pivot device fastened to said carriage and said linking bracket to pivotally secure said carriage and said first adapter to said second adapter and said linking bracket;
   wherein said carriage has a pivot hole; said linking bracket has a pivot hole pivotally connected to the pivot hole of said carriage by said pivot device.

2. The steering control coupling structure as claimed in claim 1, wherein the guide means of said first adapter has a guide hole; the guide means of said second adapter comprises a guide block respectively and movably coupled to the guide hole of said first adapter.

3. The steering control coupling structure as claimed in claim 1, wherein the guide means of said first adapter has a sector guide hole respectively formed at the periphery of the coupling means of said first adapter.

4. The steering control coupling structure as claimed in claim 3, wherein the sector guide hole of said first adapter is a 135 degree sector hole.

5. The steering control coupling structure as claimed in claim 1, wherein the guide means of said second adapter has a sector guide block respectively disposed at the periphery of the coupling means of said second adapter.

6. The steering control coupling structure as claimed in claim 5, wherein the sector guide block of said second adapter is a 45 degree sector block.

7. The steering control coupling structure as claimed in claim 1, wherein said carriage has a plurality of mounting means; said first adapter has a plurality of mounting means respectively fastened to the mounting means of said carriage.

8. The steering control coupling structure as claimed in claim 1, wherein said linking bracket has a receptacle means adapted to accommodate said second adapter.

9. The steering control coupling structure as claimed in claim 1, wherein said second adapter has a pivot hole, which pivotally receives said pivot device.

* * * * *